(12) United States Patent
Wu et al.

(10) Patent No.: US 12,638,290 B2
(45) Date of Patent: May 26, 2026

(54) INTEGRATED PHOTONICS GYROSCOPE WITH COMMON INTENSITY MODULATION

(71) Applicant: Honeywell International Inc., Charlotte, NC (US)

(72) Inventors: Jianfeng Wu, Tucson, AZ (US); Tiequn Qiu, Glendale, AZ (US); Matthew Wade Puckett, Phoenix, AZ (US); Steven Tin, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 586 days.

(21) Appl. No.: 18/182,217

(22) Filed: Mar. 10, 2023

(65) Prior Publication Data

US 2024/0302168 A1      Sep. 12, 2024

(51) Int. Cl.
*G01C 19/72* (2006.01)

(52) U.S. Cl.
CPC ......... *G01C 19/726* (2013.01); *G01C 19/727* (2013.01)

(58) Field of Classification Search
None
See application file for complete search history.

(56) References Cited

U.S. PATENT DOCUMENTS

| | | | |
|---|---|---|---|
| 4,673,293 A | 6/1987 | Sanders | |
| 5,349,441 A | 9/1994 | Sanders | |
| 5,363,195 A * | 11/1994 | Ward | G01C 19/726 |
| | | | 356/463 |

| | | | |
|---|---|---|---|
| 5,465,149 A | 11/1995 | Strandjord et al. |
| 7,522,284 B2 | 4/2009 | Sanders et al. |
| 7,535,576 B2 | 5/2009 | Keyser et al. |
| 7,844,152 B2 | 11/2010 | Sanders |
| 8,289,521 B2 | 10/2012 | Blin et al. |
| 9,803,981 B2 | 10/2017 | Schwartz et al. |
| 10,914,587 B1 | 2/2021 | Sanders et al. |

(Continued)

FOREIGN PATENT DOCUMENTS

EP          2940425 A1      11/2015

OTHER PUBLICATIONS

Wu et al., "Modulation Methods and Systems for Non-Reciprocal Kerr Reduction in Resonator Fiber Optic Gyroscopes", U.S. Appl. No. 17/846,914, filed Jun. 22, 2022, pp. 1 through 36.

(Continued)

*Primary Examiner* — Stephanie E Bloss
*Assistant Examiner* — Diana Hancock
(74) *Attorney, Agent, or Firm* — Fogg & Powers LLC

(57) ABSTRACT

A photonics gyroscope comprises a laser and a common intensity modulation unit that outputs an intensity modulated beam, split into a CCW beam having a first power level and a CW beam having a second power level. A first phase modulator (PA) receives the CCW beam, and a second PA receives the CW beam. A variable optical attenuator (VOA) is coupled to the first or second PA. The CCW beam is coupled into a resonator and the CW beam is coupled into the resonator. A first detector receives the CCW beam and a second detector receives the CW beam from the resonator. A CCW control loop locks the CCW beam, and a CW control loop locks the CW beam, to resonance peaks. The VOA receives a feedback loop signal to aid in balancing power levels between CCW and CW beams to eliminate a rate signal at an intensity modulation frequency.

20 Claims, 4 Drawing Sheets

(56)         References Cited

U.S. PATENT DOCUMENTS

| 11,656,080 | B1 * | 5/2023 | Paniccia | G01C 19/721 |
| | | | | 356/460 |
| 2014/0240712 | A1 * | 8/2014 | Strandjord | G01C 19/727 |
| | | | | 356/461 |
| 2015/0022818 | A1 | 1/2015 | Lloyd et al. | |
| 2015/0316382 | A1 * | 11/2015 | Sanders | G01C 19/727 |
| | | | | 356/461 |
| 2018/0274926 | A1 | 9/2018 | Wang | |
| 2019/0017824 | A1 * | 1/2019 | Qiu | G01C 19/667 |
| 2021/0333106 | A1 | 10/2021 | Wu et al. | |

OTHER PUBLICATIONS

European Patent Office, "Extended European Search Report", dated Nov. 26, 2024, from EP Application No. 24160029.5, from Foreign Counterpart to U.S. Appl. No. 18/182,217, pp. 1 through 12, Published: EP.

* cited by examiner

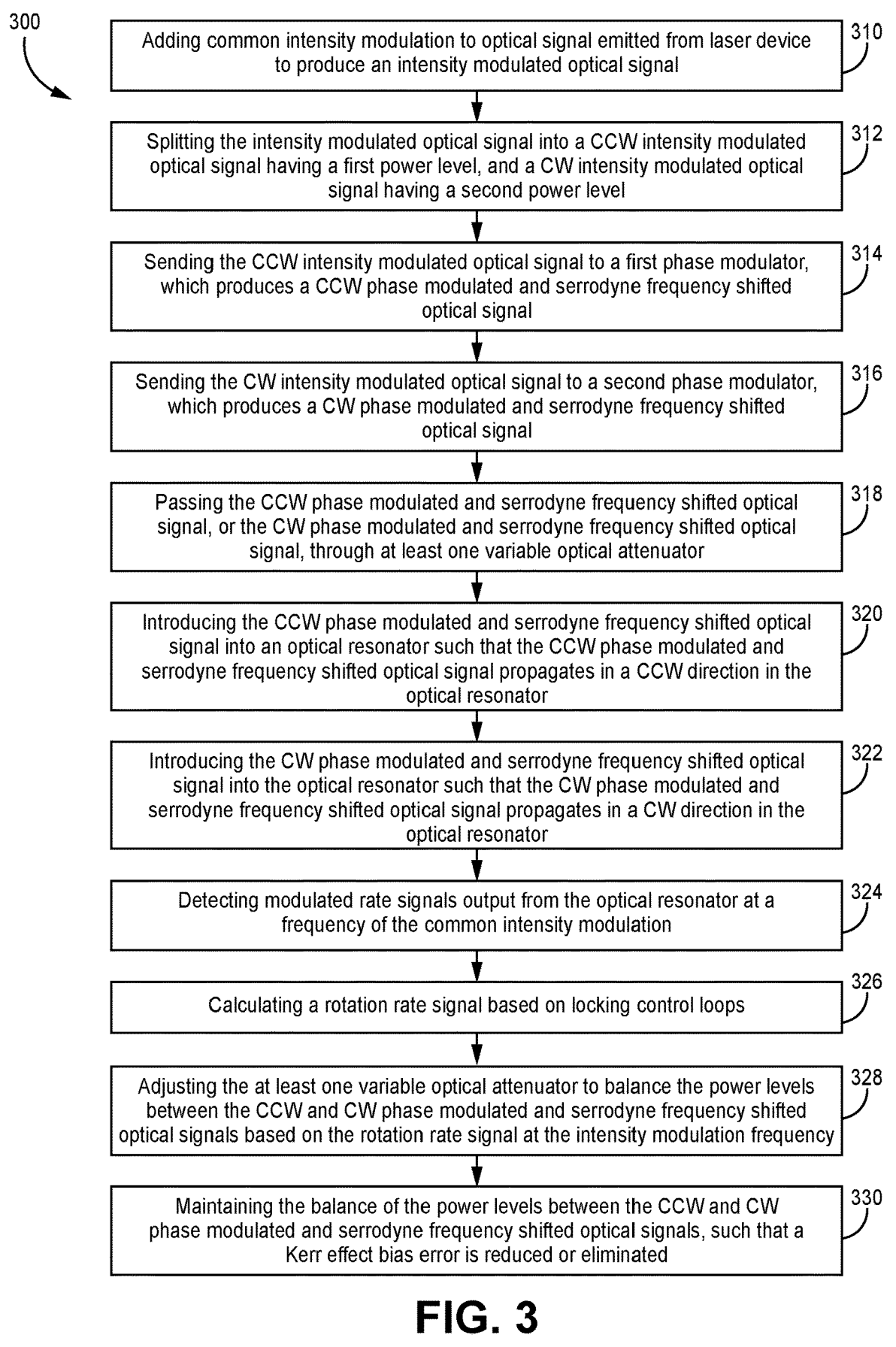

300

| |
|---|
| Adding common intensity modulation to optical signal emitted from laser device to produce an intensity modulated optical signal | 310 |

↓

| Splitting the intensity modulated optical signal into a CCW intensity modulated optical signal having a first power level, and a CW intensity modulated optical signal having a second power level | 312 |

↓

| Sending the CCW intensity modulated optical signal to a first phase modulator, which produces a CCW phase modulated and serrodyne frequency shifted optical signal | 314 |

↓

| Sending the CW intensity modulated optical signal to a second phase modulator, which produces a CW phase modulated and serrodyne frequency shifted optical signal | 316 |

↓

| Passing the CCW phase modulated and serrodyne frequency shifted optical signal, or the CW phase modulated and serrodyne frequency shifted optical signal, through at least one variable optical attenuator | 318 |

↓

| Introducing the CCW phase modulated and serrodyne frequency shifted optical signal into an optical resonator such that the CCW phase modulated and serrodyne frequency shifted optical signal propagates in a CCW direction in the optical resonator | 320 |

↓

| Introducing the CW phase modulated and serrodyne frequency shifted optical signal into the optical resonator such that the CW phase modulated and serrodyne frequency shifted optical signal propagates in a CW direction in the optical resonator | 322 |

↓

| Detecting modulated rate signals output from the optical resonator at a frequency of the common intensity modulation | 324 |

↓

| Calculating a rotation rate signal based on locking control loops | 326 |

↓

| Adjusting the at least one variable optical attenuator to balance the power levels between the CCW and CW phase modulated and serrodyne frequency shifted optical signals based on the rotation rate signal at the intensity modulation frequency | 328 |

↓

| Maintaining the balance of the power levels between the CCW and CW phase modulated and serrodyne frequency shifted optical signals, such that a Kerr effect bias error is reduced or eliminated | 330 |

FIG. 3

INTEGRATED PHOTONICS GYROSCOPE WITH COMMON INTENSITY MODULATION

BACKGROUND

The Kerr effect is a fundamental bias error source in optical gyroscopes, such as the resonator fiber optic gyroscope (RFOG). The Kerr effect is caused by the different phase shifts in the self-phase modulation (SPM) and cross-phase modulation (XPM) phenomenon. The SPM, due to the copropagating clockwise (CW) beam generates less phase shift than the XPM due to the counter-propagating counter-clockwise (CCW) beam in the RFOG. Therefore, if the CW and CCW beams encounter differential power fluctuations, the RFOG will have a non-reciprocal phase shift and cause bias error.

The Kerr bias becomes more significant in integrated photonics gyroscopes. Due to the small scale factor, the integrated photonics gyroscopes have very high finesses to reduce the cavity linewidth and increase the gyroscope sensitivity. Therefore, the intracavity intensity is much higher than the intensity in traditional resonant fiber optical gyroscopes.

Prior methods rely on passive intensity stabilization to reduce the Kerr effect. The CW and CCW intensity need to be controlled to levels of about 1 parts-per-million (ppm) to minimize the power fluctuation between the CW and CCW directions. While such methods are sufficient for traditional fiber optical gyroscopes, integrated photonics gyroscopes have a much higher Kerr effect. Thus, the intensity control needs to reach levels of about 10 parts-per-billion (ppb) for navigation grade performance, which is very challenging for integrated photonics gyroscopes.

SUMMARY

A photonics gyroscope comprises a laser device configured to emit an optical signal; a common intensity modulation unit configured to receive the optical signal from the laser device and produce an intensity modulated optical signal, wherein the intensity modulated optical signal is output from the common intensity modulation unit and split into a counter-clockwise (CCW) intensity modulated optical signal having a first power level, and a clockwise (CW) intensity modulated optical signal having a second power level; a first phase modulator optically coupled to the common intensity modulation unit, the first phase modulator configured to receive the CCW intensity modulated optical signal and produce a CCW phase modulated optical signal; a second phase modulator optically coupled to the common intensity modulation unit, the second phase modulator configured to receive the CW intensity modulated optical signal and produce a CW phase modulated optical signal; a variable optical attenuator optically coupled to the first phase modulator or optically coupled to the second phase modulator, the variable optical attenuator configured to receive the CCW phase modulated optical signal or the CW phase modulated optical signal. An optical resonator is in optical communication with the variable optical attenuator, wherein the CCW phase modulated optical signal is optically coupled into the optical resonator and propagates in a CCW direction in the optical resonator, and the CW phase modulated optical signal is optically coupled into the optical resonator and propagates in a CW direction in the optical resonator. A first optical detector is in optical communication with the optical resonator and is configured to receive the CCW phase modulated optical signal from the optical resonator, and a second optical detector is in optical communication with the optical resonator and is configured to receive the CW phase modulated optical signal from the optical resonator. A CCW control loop is operatively coupled between an output of the first optical detector and an input of the first phase modulator, the CCW control loop configured to lock the CCW phase modulated optical signal to a CCW resonance peak. A CW control loop is operatively coupled between an output of the second optical detector and an input of the second phase modulator, the CW control loop configured to lock the CW phase modulated optical signal to a CW resonance peak. A rate calculation unit is configured to receive digital signals output from the CCW control loop and the CW control loop, the rate calculation unit operative to calculate a rotation rate signal for the photonics gyroscope. The variable optical attenuator is configured to receive a signal from a feedback loop to aid in adjusting the variable optical attenuator to balance the power levels between the CCW and CW phase modulated optical signals to eliminate the rate signal at an intensity modulation frequency. The feedback loop maintains the balance of the power levels between the CCW and CW phase modulated optical signals such that a Kerr effect bias error in the photonics gyroscope is reduced or eliminated.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 3 is flow diagram of a method for reducing or eliminating a Kerr effect bias error in an integrated photonics gyroscope, according to an exemplary implementation.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An integrated photonics gyroscope, such as an integrated resonator optical gyroscope, which employs common intensity modulation, is described herein. The common intensity modulation introduces a bias error that can only be observed when the clockwise (CW) and counter-clockwise (CCW) beam power in the gyroscope is not balanced. In the present approach, power is balanced between the CW and CCW beams, which reduces or eliminates an error signal due to the intensity modulation and Kerr effect.

The present approach reduces or eliminates the Kerr bias error via an active feedback loop in the gyroscope. While the CW and CCW beams are modulated with the same intensity modulation amplitude, the unbalanced power between the CW and CCW beams will generate a bias error at the modulation frequency due to the Kerr effect. Balancing the power between a CW port a CCW port eliminates the error signal due to intensity modulation and the Kerr effect in the gyroscope.

Further details regarding the present approach are described as follows and with reference to the drawings.

Figure 1:
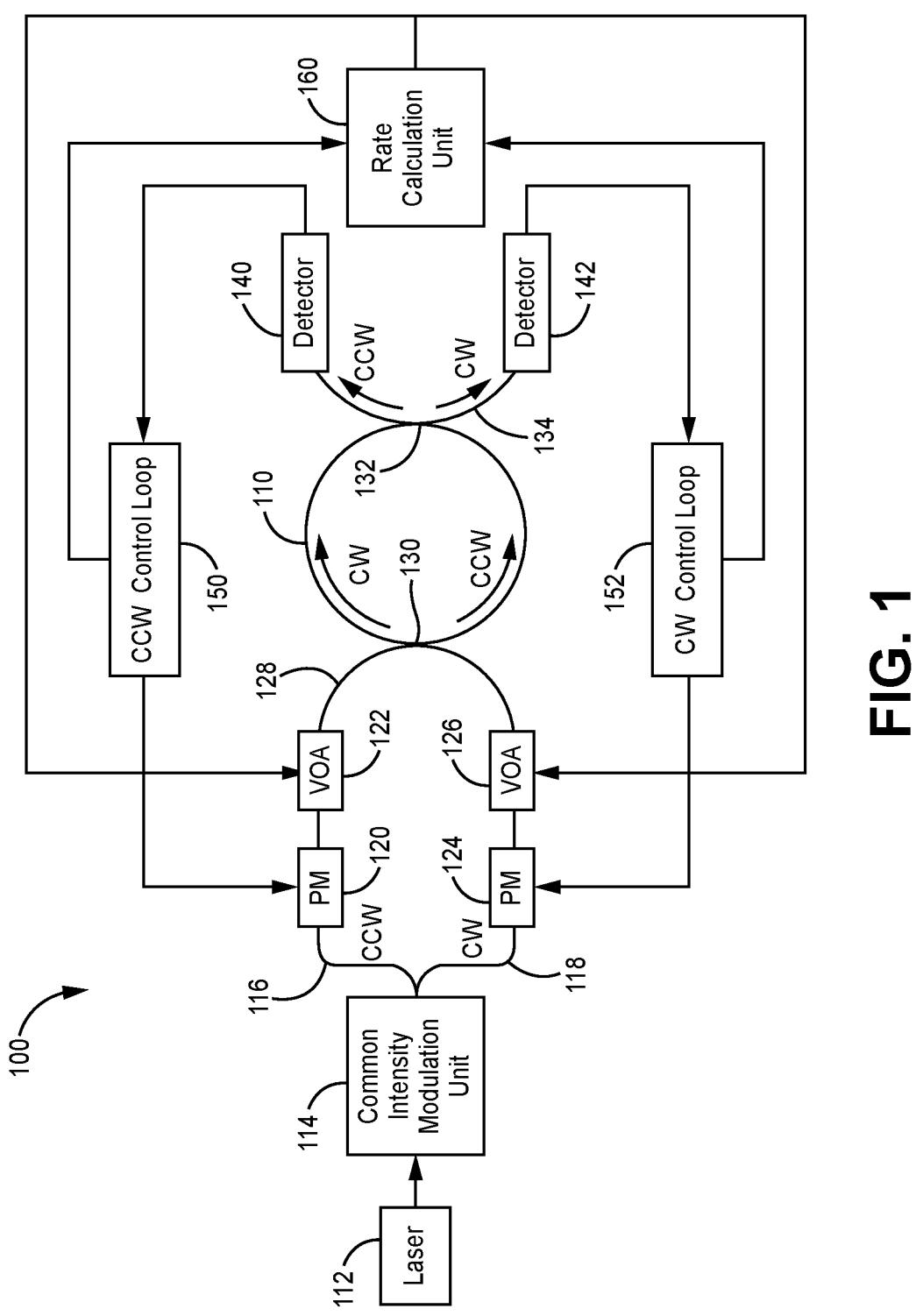
FIG. 1 is a schematic illustration of an integrated photonics gyroscope, according to one embodiment.

FIG. 1 is a schematic illustration of an integrated photonics gyroscope 100 according to one embodiment, which is configured to reduce or eliminate Kerr effect bias sensitivity. The integrated photonics gyroscope 100 generally includes an optical resonator 110, such as an on-chip waveguide ring resonator, which is in optical communication with a laser device 112 through an optical path having a plurality of optical components. The laser device 112 is configured to emit a single frequency optical signal, and can be located on the same photonics chip as optical resonator 110. Alternatively, laser device 112 can be on another chip separate from the chip where optical resonator 110 is located. For example, laser device 112 can be on a chip that is edge-coupled with the chip having optical resonator 110.

An output of laser device 112 is optically coupled to an input of a common intensity modulation unit 114, which is configured to provide an intensity modulation to the optical signal emitted by laser device 112. The intensity modulated optical signal output from common intensity modulation unit 114 is split between a first waveguide 116 and a second waveguide 118. As described further hereafter, the intensity modulated optical signal is split into a counterclockwise (CCW) signal that is fed into first waveguide 116, and a clockwise (CW) signal that is fed into second waveguide 118. Both the CW and CCW signals have the same intensity modulation amplitude.

The first waveguide 116 is optically coupled to an input of a first phase modulator (PM) 120. An output of first phase modulator 120 is optically coupled to an input of a first variable optical attenuator (VOA) 122. The second waveguide 118 is optically coupled to an input of a second phase modulator 124. An output of second phase modulator 124 is optically coupled to an input of a second variable optical attenuator 126. An output of first variable optical attenuator 122 is in optical communication with optical resonator 110 through a first coupling waveguide 128, which is optically coupled to optical resonator 110 at a first coupling region 130 on a first side of optical resonator 110. An output of second variable optical attenuator 126 is also in optical communication with optical resonator 110 through first coupling waveguide 128 at first coupling region 130.

A second coupling waveguide 134 is optically coupled to optical resonator 110 at a second coupling region 132 on a second side of optical resonator 110. An input of a first optical detector 140 is in optical communication with optical resonator 110 through second coupling waveguide 134. An input of a second optical detector 142 is also in optical communication with optical resonator 110 through second coupling waveguide 134.

A CCW control loop 150 is operatively coupled between an output of first optical detector 140 and an input of first phase modulator 120. The CCW control loop 150 is configured to lock the CCW signal to a CCW resonance peak. A CW control loop 152 is operatively coupled between an output of second optical detector 142 and an input of second phase modulator 124. The CW control loop 152 is configured to lock the CW signal to a CW resonance peak.

A rate calculation unit 160 is configured to receive digital signals output from CCW control loop 150 and CW control loop 152, and calculate a rotation rate signal for integrated photonics gyroscope 100. Each of first variable optical attenuator 122 and second variable optical attenuator 126 is configured to receive the rate signal output from rate calculation unit 160 in a feedback loop. The first variable optical attenuator 122 and second variable optical attenuator 126 receive feedback loop signals to aid in their adjustment in order to balance the power levels between the CCW and CW signals, to eliminate the rate signal at an intensity modulation frequency.

During operation of integrated photonics gyroscope 100, the single frequency optical signal from laser device 112 is directed to common intensity modulation unit 114, which modulates the amplitude of the optical signal (e.g., about 1% modulation amplitude (power fluctuation)) to produce an intensity modulated optical signal that is output from common intensity modulation unit 114. The intensity modulated optical signal is then split into a CCW signal that is fed into first waveguide 116, and a CW signal that is fed into second waveguide 118. At this point, the CCW signal has a first power level, and the CW signal has a second power level.

The CCW signal in first waveguide 116 is directed to first phase modulator 120, which is operative to provide a phase modulation and serrodyne frequency shift to the CCW signal. A serrodyne phase modulated CCW signal is then directed from first phase modulator 120 to first variable optical attenuator 122. The CW signal in second waveguide 118 is directed to second phase modulator 124, which is operative to provide a phase modulation and serrodyne frequency shift to the CW signal. A serrodyne phase modulated CW signal is then directed from second phase modulator 124 to second variable optical attenuator 122. The variable optical attenuators 122, 126 are adjustable to balance the power of the serrodyne phase modulated CW and CCW signals, such that the power levels of the CW and CCW signals are substantially equal to each other, which removes a bias error signal at the intensity modulation frequency.

The serrodyne phase modulated CW signal is sent to optical resonator 110 through first coupling waveguide 128, which couples the serrodyne phase modulated CW signal into optical resonator 110 at first coupling region 130, such that the CW signal propagates in a CW direction in optical resonator 110. The serrodyne phase modulated CCW signal is also sent to optical resonator 110 through first coupling waveguide 128, which couples the serrodyne phase modulated CCW signal into optical resonator 110 at first coupling region 130, such that the CCW signal propagates in a CCW direction in optical resonator 110.

The CCW signal circulating in optical resonator 110 is coupled out of optical resonator 110 into second coupling waveguide 134 at second coupling region 132. The first optical detector 140 receives the CCW signal from second coupling waveguide 134, and converts the received CCW signal into a corresponding electrical signal, which is sent to CCW control loop 150. The CW signal circulating in optical resonator 110 is coupled out of optical resonator 110 into second coupling waveguide 134 at second coupling region 132. The second optical detector 142 receives the CW signal, and converts the received CW signal into a corresponding electrical signal, which is sent CW control loop 152.

The CCW control loop 150 outputs a control signal that is directed to first phase modulator 120 to aid in providing the serrodyne modulation for the CCW signal. The serrodyne modulation shifts the CCW laser frequency to be on the cavity resonance in the CCW direction. The CW control loop 152 also outputs a control signal that is directed to second phase modulator 124 to aid in providing the serrodyne modulation to the CW signal. The serrodyne phase modulation shifts the CW laser frequency to be on the cavity resonance in the CW direction. The CCW control loop 150 and CW control loop 152 also output control signals (frequency shift) that are directed to rate calculation unit 160 for further processing to determine the rotation rate.

The rotation rate has a sine wave at the common intensity modulation frequency when the CW and CCW power levels are not balanced for unevenly distributed Kerr effects. A rate signal is sent from rate calculation unit 160 to each of variable optical attenuators 122 and 126 in a feedback loop to aid in adjusting variable optical attenuators 122 and 126 so as to balance the power levels of CW and CCW signals. This is turn reduces or eliminates the sine wave in the rotation rate, which reduces or eliminates an error signal due to the intensity modulation and the Kerr effect in integrated photonics gyroscope 100.

The CW and CCW power balance is controlled by the feedback loop to a level such that bias at the modulation frequency is eliminated. Unlike standard alone intensity stabilization systems, the present feedback loop uses bias as an error signal and is not limited by the low frequency environmental noise.

Figure 2:
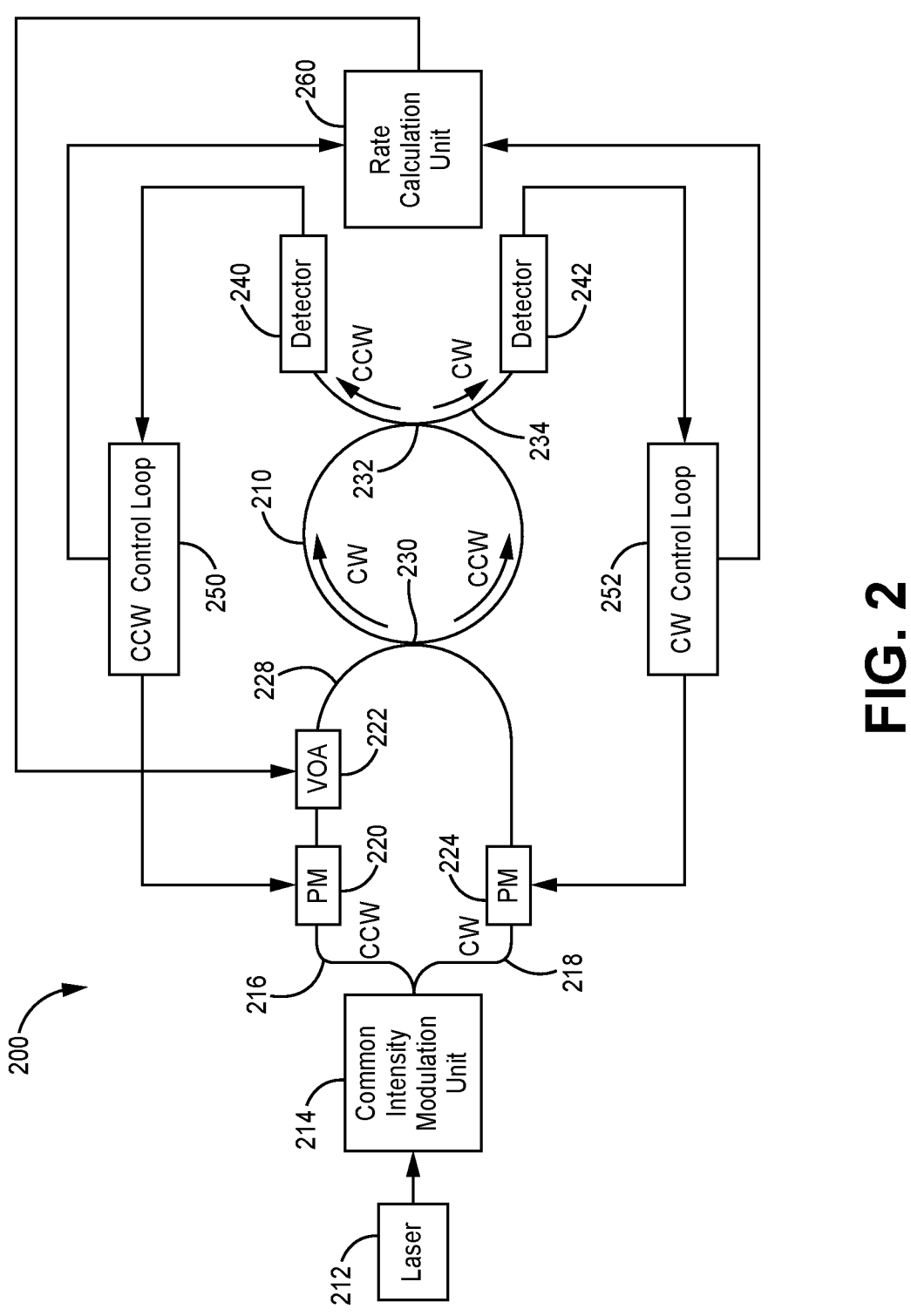
FIG. 2 is a schematic illustration of an integrated photonics gyroscope, according to another embodiment.

FIG. 2 is a schematic illustration of an integrated photonics gyroscope 200 according to one embodiment, which is configured to reduce or eliminate Kerr effect bias sensitivity. The integrated photonics gyroscope 200 generally includes an optical resonator 210, such as an on-chip waveguide ring resonator, which is in optical communication with a laser device 212 configured to emit a single frequency optical signal. The laser device 212 can be on-chip with optical resonator 210, or alternatively, laser device 212 can be on another chip separate from the chip where optical resonator 210 is located.

An output of laser device 212 is optically coupled to an input of a common intensity modulation unit 214, which is configured to provide an intensity modulation to the optical signal emitted by laser device 212. The intensity modulated optical signal output from common intensity modulation unit 214 is split between a first waveguide 216 and a second waveguide 218. The intensity modulated optical signal is split into a CCW signal that is fed into first waveguide 216, and a CW signal that is fed into second waveguide 218. Both the CW and CCW signals have the same intensity modulation amplitude.

The first waveguide 216 is optically coupled to an input of a first phase modulator 220. An output of first phase modulator 220 is optically coupled to an input of a variable optical attenuator 222. The second waveguide 218 is optically coupled to an input of a second phase modulator 224. An output of variable optical attenuator 222 is in optical communication with optical resonator 210 through a first coupling waveguide 228, which is optically coupled to optical resonator 210 at a first coupling region 230 on a first side of optical resonator 210. An output of second phase modulator 224 is also in optical communication with optical resonator 210 through first coupling waveguide 228 at first coupling region 230.

In an alternative embodiment, variable optical attenuator 222 can be moved to be coupled between an output of second phase modulator 224 and optical resonator 210, such that the CW signal would be directed from second phase modulator 224 into the variable optical attenuator before being sent to optical resonator 210.

A second coupling waveguide 234 is optically coupled to optical resonator 210 at a second coupling region 232 on a second side of optical resonator 210. An input of a first optical detector 240 is in optical communication with optical resonator 210 through second coupling waveguide 234. An input of a second optical detector 242 is also in optical communication with optical resonator 210 through second coupling waveguide 234.

A CCW control loop 250 is operatively coupled between an output of first optical detector 240 and an input of first phase modulator 220. A CW control loop 252 is operatively coupled between an output of second optical detector 242 and an input of second phase modulator 224. A rate calculation unit 260 is configured to receive digital signals output from CCW control loop 250 and CW control loop 252, and calculate a rotation rate signal for integrated photonics gyroscope 200. The variable optical attenuator 222 is configured to receive the rate signal output from rate calculation unit 260 in a feedback loop.

During operation of integrated photonics gyroscope 200, the single frequency optical signal from laser device 212 is directed to common intensity modulation unit 214, which modulates the amplitude of the optical signal (e.g., about 1% modulation amplitude) to produce an intensity modulated optical signal that is output from common intensity modulation unit 214. The intensity modulated optical signal is then split into a CCW signal that is fed into first waveguide 216, and a CW signal that is fed into second waveguide 218. At this point, the CCW signal has a first power level, and the CW signal has a second power level.

The CCW signal in first waveguide 216 is directed to first phase modulator 220, which is operative to provide a phase modulation and serrodyne frequency shift to the CCW signal. A serrodyne phase modulated CCW signal is then directed from first phase modulator 220 to variable optical attenuator 222. The CW signal in second waveguide 218 is directed to second phase modulator 224, which is operative to provide a phase modulation and serrodyne frequency shift to the CW signal. The second phase modulator 224 outputs a serrodyne phase modulated CW signal The variable optical attenuator 222 is adjustable to balance the power of the serrodyne phase modulated CW and CCW signals, such that the power levels of the CW and CCW signals are substantially equal to each other, which removes a bias error signal at the intensity modulation frequency.

The serrodyne phase modulated CW signal output from second phase modulator 224 is directed to optical resonator 210 through first coupling waveguide 228, which couples the serrodyne phase modulated CW signal into optical resonator 210 at first coupling region 230. The CW signal then propagates in a CW direction in optical resonator 210. The serrodyne phase modulated CCW signal is sent from variable optical attenuator 222 to optical resonator 210 through first coupling waveguide 228, which couples the serrodyne phase modulated CCW signal into optical resonator 210 at first coupling region 230. The CCW signal then propagates in a CCW direction in optical resonator 210.

The CCW signal circulating in optical resonator 210 is coupled out of optical resonator 210 into second coupling waveguide 234 at second coupling region 232. The first optical detector 240 receives the CCW signal from second coupling waveguide 234, and converts the received CCW signal into a corresponding electrical signal, which is sent to CCW control loop 250. The CW signal circulating in optical resonator 210 is coupled out of optical resonator 210 into second coupling waveguide 234 at second coupling region 232. The second optical detector 242 receives the CW signal, and converts the received CW signal into a corresponding electrical signal, which is sent CW control loop 252.

The CCW control loop 250 outputs a control signal that is directed to first phase modulator 220 to aid in providing the serrodyne phase modulation for the CCW signal. The CW control loop 252 also outputs a control signal that is directed to second phase modulator 224 to aid in providing the serrodyne phase modulation to the CW signal. The CCW control loop 250 and CW control loop 252 also output control signals that are directed to rate calculation unit 260 for further processing to determine the rotation rate.

The rotation rate has a sine wave at the common intensity modulation frequency when the CW and CCW power levels are not balanced for unevenly distributed Kerr effects. A rate signal is sent from rate calculation unit 260 to variable optical attenuator 222 in a feedback loop to aid in adjusting variable optical attenuator 222 so as to balance the power levels of the CW and CCW signals. This in turn reduces or eliminates the sine wave in the rotation rate, which reduces or eliminates an error signal due to the intensity modulation and the Kerr effect in integrated photonics gyroscope 200.

The photonics gyroscopes described herein can be fabricated by utilizing one of several well-established integrated photonics fabrication processes. In these fabrication processes, photonic integrated circuits can be fabricated with a wafer-scale technology involving lithography, on substrates (i.e., chips) of silicon, silica, or a nonlinear crystal material such as lithium niobate.

In other implementations, the photonics gyroscopes described herein can be fabricated by using an ultra-low loss silicon nitride waveguide platform. The silicon nitride waveguide platform allows low-loss waveguides with a small bend radius to made, along with various types of photonic components.

FIG. 3 is flow diagram of a method 300 for reducing or eliminating a Kerr effect bias error in a photonics gyroscope, according to an exemplary implementation. The method 300 comprises adding a common intensity modulation to an optical signal emitted from a laser device to produce an intensity modulated optical signal (block 310); and splitting the intensity modulated optical signal into a CCW intensity modulated optical signal having a first power level, and a CW intensity modulated optical signal having a second power level (block 312). The common intensity modulation is used by method 300 to determine the difference between the first and second power levels. The method 300 further includes sending the CCW intensity modulated optical signal to a first phase modulator, which produces a CCW phase modulated and serrodyne frequency shifted optical signal (block 314); sending the CW intensity modulated optical signal to a second phase modulator, which produces a CW phase modulated and serrodyne frequency shifted optical signal (block 316); and passing the CCW phase modulated and serrodyne frequency shifted optical signal, or the CW phase modulated and serrodyne frequency shifted optical signal, through at least one variable optical attenuator (block 318). For example, a variable optical attenuator can be optically coupled to the first phase modulator or the second phase modulator. Alternatively, a first variable optical attenuator can be optically coupled to the first phase modulator, and a second variable optical attenuator can be optically coupled to a second phase modulator.

The method 300 then introduces the CCW phase modulated and serrodyne frequency shifted optical signal into an optical resonator such that the CCW phase modulated and serrodyne frequency shifted optical signal propagates in a CCW direction in the optical resonator (block 320); and introduces the CW phase modulated and serrodyne frequency shifted optical signal into the optical resonator such that the CW phase modulated and serrodyne frequency shifted optical signal propagates in a CW direction in the optical resonator (block 322). The method 300 detects modulated rate signals output from the optical resonator at a frequency of the common intensity modulation (block 324); and calculates a rotation rate signal based on locking control loops (block 326). The method 300 adjusts the variable optical attenuator to balance the power levels between the CCW and CW phase modulated and serrodyne frequency shifted optical signals based on the rotation rate signal at the intensity modulation frequency (block 328); and maintains the balance of the power levels between the CCW and CW phase modulated and serrodyne frequency shifted optical signals, such that a Kerr effect bias error is reduced or eliminated (block 330).

The intensity adjusting signal can be sent to the variable optical attenuator in a feedback loop to aid in adjusting the variable optical attenuator to balance the power levels between the CCW and CW beams. The feedback loop also aids in maintaining the balance of the power levels between the CCW and CW beams, such that the power levels are substantially equal to each other.

Figure 4:
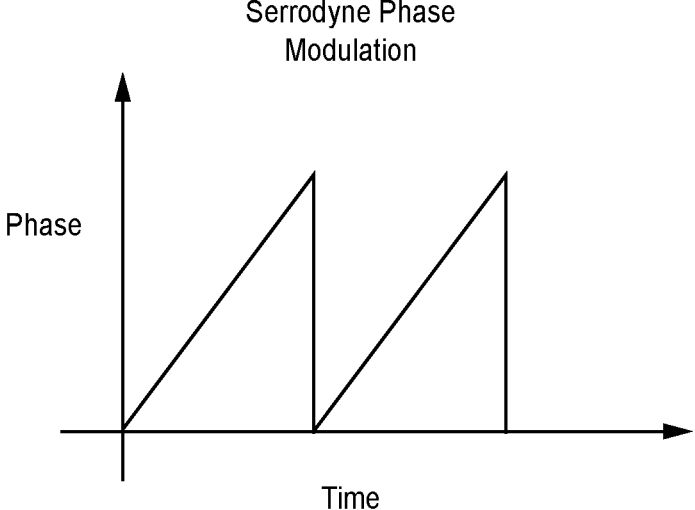
FIG. 4 is a graphical representation of a serrodyne phase modulation that can be applied in the method of FIG. 3.

FIG. 4 is a graphical representation of a serrodyne phase modulation that can be applied in the operation of the present photonics gyroscopes. As shown in FIG. 4, the serrodyne phase modulation produces a sawtooth wave form of the phase with respect to time. This allows for tuning of the laser frequency, by shifting the frequency to match a resonant peak of the optical resonator, and for phase tuning of the CW and CCW beams in the photonics gyroscope. In addition, a sine wave phase modulation can be applied to the phase modulators and is used for resonance peak detection.

Example Embodiments

Example 1 includes a photonics gyroscope, comprising: a laser device configured to emit an optical signal; a common intensity modulation unit configured to receive the optical signal from the laser device and produce an intensity modulated optical signal, wherein the intensity modulated optical signal is output from the common intensity modulation unit and split into a counter-clockwise (CCW) intensity modulated optical signal having a first power level, and a clockwise (CW) intensity modulated optical signal having a second power level; a first phase modulator optically coupled to the common intensity modulation unit, the first phase modulator configured to receive the CCW intensity modulated optical signal and produce a CCW phase modulated optical signal; a second phase modulator optically coupled to the common intensity modulation unit, the second phase modulator configured to receive the CW intensity modulated optical signal and produce a CW phase modulated optical signal; a first variable optical attenuator optically coupled to the first phase modulator, or optically coupled to the second phase modulator, the first variable optical attenuator configured to receive the CCW phase modulated optical signal or the CW phase modulated optical signal; an optical resonator in optical communication with the first variable optical attenuator, wherein the CCW phase modulated optical signal is optically coupled into the optical resonator and propagates in a CCW direction in the optical resonator, and the CW phase modulated optical signal is optically coupled into the optical resonator and propagates in a CW direction in the optical resonator; a first optical detector in optical communication with the optical resonator, and configured to receive the CCW phase modulated optical signal from the optical resonator; a second optical detector in optical communication with the optical resonator and configured to receive the CW phase modulated optical signal from the optical resonator; a CCW control loop operatively coupled between an output of the first optical detector and an input of the first phase modulator, the CCW control loop configured to lock the CCW phase modulated optical signal to a CCW resonance peak; a CW control loop operatively coupled between an output of the second optical detector and an input of the second phase modulator, the CW control loop configured to lock the CW phase modulated optical signal to a CW resonance peak; and a rate calculation unit configured to receive digital signals output from the CCW control loop and the CW control loop, the rate calculation unit operative to calculate a rotation rate signal for the photonics gyroscope; wherein the first variable optical attenuator is configured to receive a signal from a feedback loop to aid in adjusting the first variable optical attenuator to balance the power levels between the CCW and CW phase modulated optical signals to eliminate the rate signal at an intensity modulation frequency; wherein the feedback loop maintains the balance of the power levels between the CCW and CW phase modulated optical signals such that a Kerr effect bias error in the photonics gyroscope is reduced or eliminated.

Example 2 includes the photonics gyroscope of Example 1, wherein the laser device is configured to emit the optical signal at a single frequency.

Example 3 includes the photonics gyroscope of any of Examples 1-2, wherein the intensity modulated optical signal from the common intensity modulation unit is split between a first input waveguide and a second input waveguide, such that the CCW intensity modulated optical signal is fed into the first input waveguide, and the CW intensity modulated optical signal is fed into the second input waveguide.

Example 4 includes the photonics gyroscope of Example 3, wherein the first input waveguide is optically coupled to an input of the first phase modulator, and the second input waveguide is optically coupled to an input of the second phase modulator.

Example 5 includes the photonics gyroscope of any of Examples 1-4, wherein the first phase modulator is configured to provide a serrodyne phase modulation to the CCW intensity modulated optical signal, and the second phase modulator is configured to provide a serrodyne phase modulation to the CW intensity modulated optical signal.

Example 6 includes the photonics gyroscope of Example 5, wherein an output of the first variable optical attenuator is in optical communication with the optical resonator through a first coupling waveguide, which is optically coupled to the optical resonator at an first coupling region on a first side of the optical resonator.

Example 7 includes the photonics gyroscope of Example 6, wherein an output of the second phase modulator is in optical communication with the optical resonator through the first coupling waveguide at the first coupling region.

Example 8 includes the photonics gyroscope of Example 7, wherein a second coupling waveguide is optically coupled to the optical resonator at a second coupling region on a second side of the optical resonator.

Example 9 includes the photonics gyroscope of Example 8, wherein an input of the first optical detector is in optical communication with the optical resonator through the second coupling waveguide, and an input of the second optical detector is in optical communication with the optical resonator through the second coupling waveguide.

Example 10 includes the photonics gyroscope of Example 9, wherein: the CCW phase modulated optical signal is coupled out of the optical resonator into the second coupling waveguide at the second coupling region, the first optical detector configured to receive the CCW phase modulated optical signal from the second coupling waveguide and convert the received signal into a corresponding electrical signal, which is sent to the CCW control loop; and the CW phase modulated optical signal is coupled out of the optical resonator into the second coupling waveguide at the second coupling region, the second optical detector configured to receive the CW phase modulated optical signal from the second coupling waveguide and convert the received signal into a corresponding electrical signal, which is sent to the CW control loop.

Example 11 includes the photonics gyroscope of Example 10, wherein: the CCW control loop is configured to output a control signal that is directed to the first phase modulator to aid in providing the serrodyne phase modulation for the CCW phase modulated optical signal; and the CW control loop is configured to output a control signal that is directed to the second phase modulator to aid in providing the serrodyne phase modulation to the CW phase modulated optical signal.

Example 12 includes the photonics gyroscope of any of Examples 10-11, wherein the CCW control loop and the CW control loop are configured to output control signals that are directed to the rate calculation unit for further processing to aid in the calculation of the rotation rate signal.

Example 13 includes the photonics gyroscope of any of Examples 1-12, further comprising a second variable optical attenuator optically coupled to the second phase modulator, wherein the first variable optical attenuator is optically coupled to the first phase modulator.

Example 14 includes the photonics gyroscope of Example 13, wherein the first variable optical attenuator is configured to receive the CCW phase modulated optical signal, and the second variable optical attenuator is configured to receive the CW phase modulated optical signal, wherein an output of the second variable optical attenuator is in optical communication with the optical resonator.

Example 15 includes the photonics gyroscope of any of Examples 1-14, wherein the common intensity modulation unit, the phase modulators, the first and second optical detectors, the variable optical attenuator, the control loops, and the rate calculation unit, are integrated on a single photonics chip with the optical resonator.

Example 16 includes the photonics gyroscope of Example 15, wherein the laser device is located on the photonics chip with the optical resonator.

Example 17 includes the photonics gyroscope of Example 15, wherein the laser device is located on a different chip than the photonics chip with the optical resonator.

Example 18 includes a method comprising: providing a photonics gyroscope comprising a laser device configured to emit an optical signal, and an optical resonator in optical communication with the laser device through an optical path having a plurality of optical components; adding a common intensity modulation to the optical signal emitted from the laser device to produce an intensity modulated optical signal; splitting the intensity modulated optical signal into a counter-clockwise (CCW) intensity modulated optical signal having a first power level, and a clockwise (CW) intensity modulated optical signal having a second power level; sending the CCW intensity modulated optical signal to a first phase modulator, which produces a CCW serrodyne phase modulated optical signal; sending the CW intensity modulated optical signal to a second phase modulator, which produces a CW serrodyne phase modulated optical signal; providing at least one variable optical attenuator optically coupled to the first phase modulator, optically coupled to the second phase modulator, or optically coupled to both the first and second phase modulators, the at least one variable optical attenuator configured to receive the CCW serrodyne phase modulated optical signal or the CW serrodyne phase modulated optical signal; introducing the CCW serrodyne phase modulated optical signal into the optical resonator such that the CCW serrodyne phase modulated optical signal propagates in a CCW direction in the optical resonator; introducing the CW serrodyne phase modulated optical signal into the optical resonator such that the CW serrodyne phase modulated optical signal propagates in a CW direction in the optical resonator; detecting modulated rate signals that are output from the optical resonator at a frequency of the common intensity modulation; calculating a rotation rate signal for the photonics gyroscope based on locking control loops; adjusting the at least one variable optical attenuator to balance the power levels between the CCW and CW serrodyne phase modulated optical signals based on the rotation rate signal; and maintaining the balance of the power levels between the CCW and CW serrodyne phase modulated optical signals, such that a Kerr effect bias error is reduced or eliminated.

Example 19 includes the method of Example 18, wherein the balance of the power levels between the CCW and CW serrodyne phase modulated optical signals is maintained such that the power levels are substantially equal to each other.

Example 20 includes the method of any of Examples 18-19, wherein: the rotation rate signal is sent to the at least one variable optical attenuator in a feedback loop to aid in adjusting the at least one variable optical attenuator to balance the power levels between the CCW and CW serrodyne phase modulated optical signals; and the feedback loop aids in maintaining the balance of the power levels between the CCW and CW serrodyne phase modulated optical signals.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A photonics gyroscope, comprising:
a laser device configured to emit an optical signal;
a common intensity modulation unit configured to receive the optical signal from the laser device and produce an intensity modulated optical signal, wherein the intensity modulated optical signal is output from the common intensity modulation unit and split into a counter-clockwise (CCW) intensity modulated optical signal having a first power level, and a clockwise (CW) intensity modulated optical signal having a second power level;
a first phase modulator optically coupled to the common intensity modulation unit, the first phase modulator configured to receive the CCW intensity modulated optical signal and produce a CCW phase modulated optical signal;
a second phase modulator optically coupled to the common intensity modulation unit, the second phase modulator configured to receive the CW intensity modulated optical signal and produce a CW phase modulated optical signal;
a first variable optical attenuator optically coupled to the first phase modulator, or optically coupled to the second phase modulator, the first variable optical attenuator configured to receive the CCW phase modulated optical signal or the CW phase modulated optical signal;
an optical resonator in optical communication with the first variable optical attenuator, wherein the CCW phase modulated optical signal is optically coupled into the optical resonator and propagates in a CCW direction in the optical resonator, and the CW phase modulated optical signal is optically coupled into the optical resonator and propagates in a CW direction in the optical resonator;
a first optical detector in optical communication with the optical resonator, and configured to receive the CCW phase modulated optical signal from the optical resonator;
a second optical detector in optical communication with the optical resonator and configured to receive the CW phase modulated optical signal from the optical resonator;
a CCW control loop operatively coupled between an output of the first optical detector and an input of the first phase modulator, the CCW control loop configured to lock the CCW phase modulated optical signal to a CCW resonance peak;
a CW control loop operatively coupled between an output of the second optical detector and an input of the second phase modulator, the CW control loop configured to lock the CW phase modulated optical signal to a CW resonance peak; and
a rate calculation unit configured to receive digital signals output from the CCW control loop and the CW control loop, the rate calculation unit operative to calculate a rotation rate signal for the photonics gyroscope;
wherein the first variable optical attenuator is configured to receive a signal from a feedback loop to aid in adjusting the first variable optical attenuator to balance the power levels between the CCW and CW phase modulated optical signals to eliminate the rate signal at an intensity modulation frequency;
wherein the feedback loop maintains the balance of the power levels between the CCW and CW phase modulated optical signals such that a Kerr effect bias error in the photonics gyroscope is reduced or eliminated;
wherein the common intensity modulation unit, the phase modulators, the optical detectors, the variable optical attenuator, the control loops, and the rate calculation unit, are integrated on a single photonics chip with the optical resonator.

2. The photonics gyroscope of claim 1, wherein the laser device is configured to emit the optical signal at a single frequency.

3. The photonics gyroscope of claim 1, wherein the intensity modulated optical signal from the common intensity modulation unit is split between a first input waveguide and a second input waveguide, such that the CCW intensity modulated optical signal is fed into the first input waveguide, and the CW intensity modulated optical signal is fed into the second input waveguide.

4. The photonics gyroscope of claim 3, wherein the first input waveguide is optically coupled to an input of the first phase modulator, and the second input waveguide is optically coupled to an input of the second phase modulator.

5. The photonics gyroscope of claim 4, wherein the first phase modulator is configured to provide a serrodyne phase modulation to the CCW intensity modulated optical signal, and the second phase modulator is configured to provide a serrodyne phase modulation to the CW intensity modulated optical signal.

6. The photonics gyroscope of claim 5, wherein an output of the first variable optical attenuator is in optical communication with the optical resonator through a first coupling waveguide, which is optically coupled to the optical resonator at a first coupling region on a first side of the optical resonator.

7. The photonics gyroscope of claim 6, wherein an output of the second phase modulator is in optical communication with the optical resonator through the first coupling waveguide at the first coupling region.

8. The photonics gyroscope of claim 7, wherein a second coupling waveguide is optically coupled to the optical resonator at a second coupling region on a second side of the optical resonator.

9. The photonics gyroscope of claim 8, wherein an input of the first optical detector is in optical communication with the optical resonator through the second coupling waveguide, and an input of the second optical detector is in optical communication with the optical resonator through the second coupling waveguide.

10. The photonics gyroscope of claim 9, wherein:

the CCW phase modulated optical signal is coupled out of the optical resonator into the second coupling waveguide at the second coupling region, the first optical detector configured to receive the CCW phase modulated optical signal from the second coupling waveguide and convert the received signal into a corresponding electrical signal, which is sent to the CCW control loop; and the CW phase modulated optical signal is coupled out of the optical resonator into the second coupling waveguide at the second coupling region, the second optical detector configured to receive the CW phase modulated optical signal from the second coupling waveguide and convert the received signal into a corresponding electrical signal, which is sent to the CW control loop.

11. The photonics gyroscope of claim 10, wherein:

the CCW control loop is configured to output a control signal that is directed to the first phase modulator to aid in providing the serrodyne phase modulation for the CCW phase modulated optical signal; and the CW control loop is configured to output a control signal that is directed to the second phase modulator to aid in providing the serrodyne phase modulation to the CW phase modulated optical signal.

12. The photonics gyroscope of claim 10, wherein the CCW control loop and the CW control loop are configured to output control signals that are directed to the rate calculation unit for further processing to aid in the calculation of the rotation rate signal.

13. The photonics gyroscope of claim 1, further comprising a second variable optical attenuator optically coupled to the second phase modulator, wherein the first variable optical attenuator is optically coupled to the first phase modulator.

14. The photonics gyroscope of claim 13, wherein the first variable optical attenuator is configured to receive the CCW phase modulated optical signal, and the second variable optical attenuator is configured to receive the CW phase modulated optical signal, wherein an output of the second variable optical attenuator is in optical communication with the optical resonator.

15. The photonics gyroscope of claim 1, wherein the laser device is located on the photonics chip with the optical resonator.

16. The photonics gyroscope of claim 1, wherein the laser device is located on a different chip than the photonics chip with the optical resonator.

17. A method comprising:

providing a photonics gyroscope comprising a laser device configured to emit an optical signal, and an optical resonator in optical communication with the laser device through an optical path having a plurality of optical components;

adding a common intensity modulation to the optical signal emitted from the laser device to produce an intensity modulated optical signal;

splitting the intensity modulated optical signal into a counter-clockwise (CCW) intensity modulated optical signal having a first power level, and a clockwise (CW) intensity modulated optical signal having a second power level;

sending the CCW intensity modulated optical signal to a first phase modulator, which produces a CCW serrodyne phase modulated optical signal;

sending the CW intensity modulated optical signal to a second phase modulator, which produces a CW serrodyne phase modulated optical signal;

providing at least one variable optical attenuator optically coupled to the first phase modulator, optically coupled to the second phase modulator, or optically coupled to both the first and second phase modulators, the at least one variable optical attenuator configured to receive the CCW serrodyne phase modulated optical signal or the CW serrodyne phase modulated optical signal;

introducing the CCW serrodyne phase modulated optical signal into the optical resonator such that the CCW serrodyne phase modulated optical signal propagates in a CCW direction in the optical resonator;

introducing the CW serrodyne phase modulated optical signal into the optical resonator such that the CW serrodyne phase modulated optical signal propagates in a CW direction in the optical resonator;

detecting modulated rate signals that are output from the optical resonator at a frequency of the common intensity modulation;

calculating a rotation rate signal for the photonics gyroscope based on locking control loops;

adjusting the at least one variable optical attenuator to balance the power levels between the CCW and CW serrodyne phase modulated optical signals based on the rotation rate signal; and maintaining the balance of the power levels between the CCW and CW serrodyne phase modulated optical signals, such that a Kerr effect bias error is reduced or eliminated;

wherein the plurality of optical components including the phase modulators, the at least one variable optical attenuator, and the control loops, are integrated on a single photonics chip with the optical resonator.

18. The method of claim 17, wherein the balance of the power levels between the CCW and CW serrodyne phase modulated optical signals is maintained such that the power levels are substantially equal to each other.

19. The method of claim 17, wherein:

the rotation rate signal is sent to the at least one variable optical attenuator in a feedback loop to aid in adjusting the at least one variable optical attenuator to balance the power levels between the CCW and CW serrodyne phase modulated optical signals; and the feedback loop aids in maintaining the balance of the power levels between the CCW and CW serrodyne phase modulated optical signals.

20. The method of claim 17, wherein:

the laser device is located on the photonics chip with the optical resonator; or the laser device is located on a different chip than the photonics chip with the optical resonator.

* * * * *